United States Patent Office 3,455,537
Patented July 15, 1969

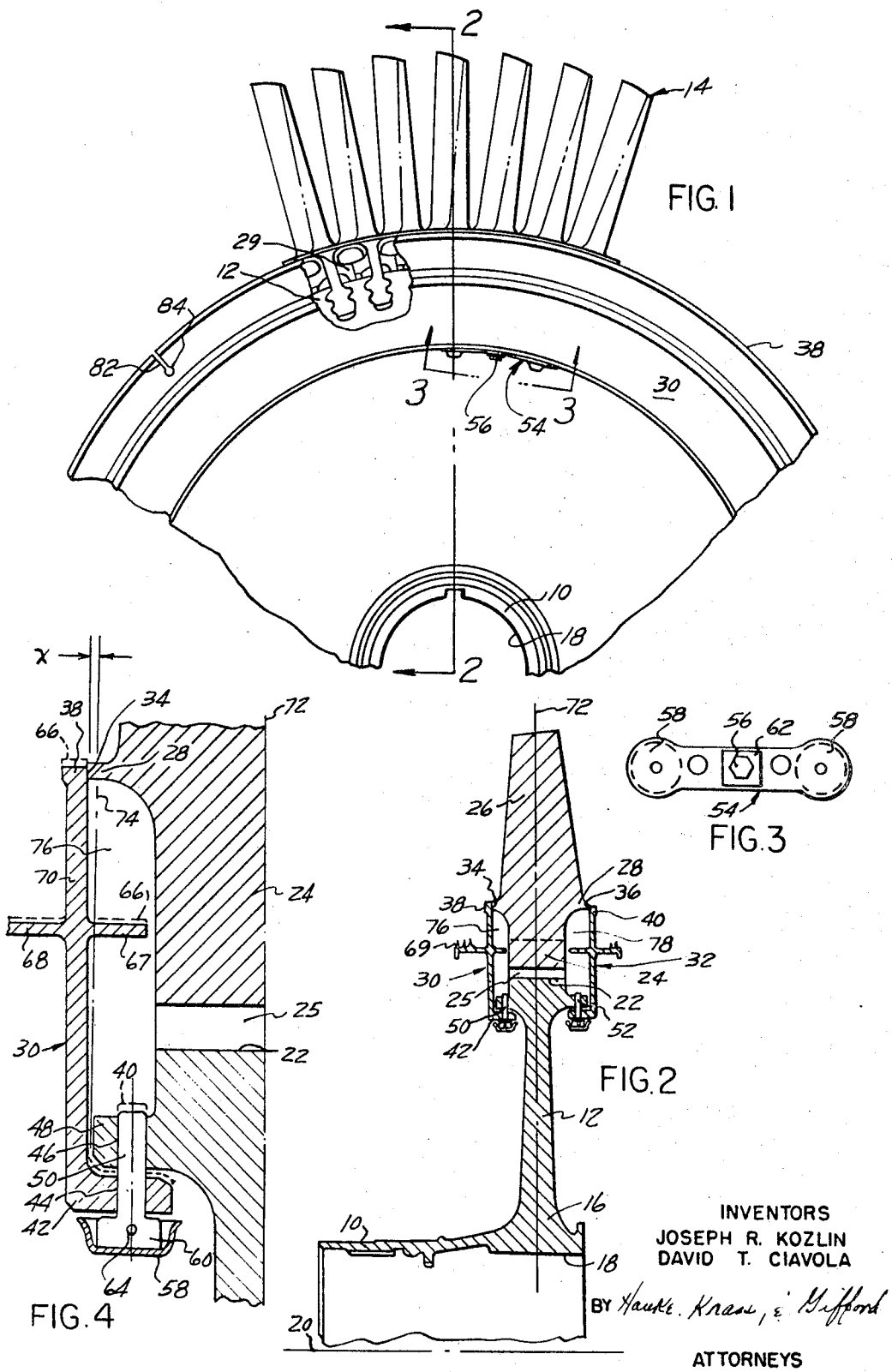
July 15, 1969  J. R. KOZLIN ETAL  3,455,537
AIR-COOLED TURBINE ROTOR SELF-SUSTAINING SHROUD PLATE
Filed Sept. 27, 1967
INVENTORS
JOSEPH R. KOZLIN
DAVID T. CIAVOLA
ATTORNEYS

3,455,537
AIR-COOLED TURBINE ROTOR SELF-SUSTAINING SHROUD PLATE
Joseph R. Kozlin, St. Clair Shores, and David T. Ciavola, Warren, Mich., assignors to Continental Aviation and Engineering Corporation, Detroit, Mich., a corporation of Virginia
Filed Sept. 27, 1967, Ser. No. 670,902
Int. Cl. F01d 5/08, 5/18
U.S. Cl. 253—39.15                                    11 Claims

ABSTRACT OF THE DISCLOSURE

A cooling-air guide shroud plate for a turbine rotor that is a self-sustaining entity such that the centrifugal load on the plate is entirely containable within the plate itself whereby the plate needs no radial support during engine operation.

BACKGROUND OF THE INVENTION

Field of the invention

The present invention relates to the art of rotor assemblies for gas turbine engines and more particularly to a cooling-air shroud plate construction for use with air cooled turbine rotors.

Description of the prior art

In the prior art, various methods of mounting shroud plates for air cooled turbine rotors have been used. Primarily, mechanical securing means such as bolts, for example, have been employed to provide positive radial support of the plates during engine operation. Still other types of mechanical securing means such as hook projections, radial projecting flanges or the like for engagement in undercut channels have also been employed. All the aforementioned methods of securing the shroud plate require substantial amounts of material resulting in excess weight design problems of the structure. Furthermore, heating problems are encountered with the above-mentioned types of positive securing means that do not allow freedom of independent radial expansion between the shroud plate and the turbine rotor. Outward deflection away from the disc portion of the rotor and resultant gross leakage of the cooling air is a further disadvantage of certain of the prior art shroud plate structures.

Attention is directed to United States Letters Patent Nos. 2,928,650; 2,985,426; and 3,096,074 illustrating the use of various of the aforementioned structural arrangements to secure the shroud plate to the rotor.

SUMMARY

The present invention has overcome the prior art difficulties mentioned above by means of a shroud plate structure and mounting therefor wherein a self-sustaining entity is provided which allows the plate to expand radially inward and outward, freely and independently of the rotor disc. This has been achieved by a shroud plate design wherein the centrifugal load of the plates is entirely containable in the plate structure whereby the tangential stress capacity is completely within the plate structure such that no radial support is required during engine operation. This result is achieved by means of a unique flexible conical plate arrangement wherein the dynamic loads on the plate allow blade platform rim clamping and sealing of the cooling air manifold space formed between the plate and the adjacent turbine disc and blade stem, in combination with mounting means to allow for axial positioning of the plates and resultant axial positioning of the blades. Applicants' conical plate design also achieves dynamic equalization of internal air pressure load preventing plate outward deflection away from the turbine disc and resultant gross leakage of cooling air.

BRIEF DESCRIPTION OF THE DRAWINGS

FIG. 1 is an axial view of one form of turbine rotor view structure with a portion of the cooling-air shroud plate removed;

FIG. 2 is an axial section taken on the line 2—2 of FIG. 1 of the radially outer portion of the rotor construction;

FIG. 3 is a detail view taken in the direction of arrows 3—3 of FIG. 1; and

FIG. 4 is an enlarged view of the upstream shroud plate of FIG. 2.

DESCRIPTION OF THE PREFERRED EMBODIMENT

Referring now to FIGS. 1 and 2, the rotor assembly comprises a hollow shaft 10 integrally formed with a turbine rotor having a blade carrying disc 12 and a ring of blades 14 carried by the disc 12. The disc 12 has a thickened hub portion 16 surrounded by a central bore 18, the axis of rotation of the assembly being shown at 20. The disc 12 has slots 22 around its periphery and extending from face to face of the disc 12. In each slot 22 is mounted, by means of its root portion 24, an individual blade indicated at 26. In the example being described, the root portions 24 are of the familiar "fir-tree" formation.

The slots 22 and the root portions 24 define between them, generally axially extending channels 25 such that these channels 25 convey cooling fluid from one side of the rotor blade to the other. Each blade 26 has an integral blade 26 platform 28 which together with the other blade platforms forms part of a wall of the working fluid annulus of the turbine rotor. Suitable spacer members 29 are provided to seal the junctures between the platforms 28 of adjacent blades.

The rotor also comprises a pair of annular shroud plate members 30 and 32 such that the plate 30 functions to seal the upstream surfaces 34 of the blade platform 28 and the plate 32 seals the downstream surfaces 36 of the blade platform 28. Each of the plate members 30 and 32 have rim portions 38 and 40, respectively bearing against the axially facing surfaces 34 and 36 in sealing relation during rotator operation in a manner to be described.

As best seen in the enlarged FIG. 4, the shroud plate 30 is retained in position by providing at its inner edge an axial flange 42 provided with a number of circumferentially spaced apertures or bores 44 aligned with cooperating apertures or bores 46 in a disc flange 48 for the reception of diametrically-positioned locating-pins generally indicated at 50. Similar locating pins 52 are provided for the shroud plate 32.

As the pin means for both the upstream and downstream shroud plates 30 and 32 are identical, only the locating pins 50 for the plate 32 will be described in detail, it being understood that the pins 52 in conjunction with plate 32 operate in substantially the same manner.

As illustrated in FIG. 4, each center pin 50 is located in the aligned bores 44 and 46 so as to be freely movable in a radial direction from the static position shown in full lines, to the approximate position indicated by broken line 40. The pins 50 are held in position by means of the retainer members 54 shown in the detail view of FIG. 3. As seen in FIG. 1, each retainer 54 is bolted to the flange portion 42 of the shroud 30 by means of a single bolt member 56 such that each retainer cup portion 58, located at each end of the retainer 54, encases head 60 of the pin 50. A suitable lock washer, indicated at 62 in FIG. 3, may be provided to lock the bolt 56 securely to the flange 42. Dowel holes, indicated at 64 in FIG. 4, or other suitable means may be employed to allow for ready removal of the pins 50 by means of a tool that can be inserted therein.

It can thus be seen from the above described arrangement of parts that applicants' securing means permit the shroud members 30 and 32 to grow radially inward and outward, freely and independently of the turbine disc 12. The plurality of pins 50 and 52 act to maintain centralization of the shroud members 30 and 32, respectively, during all engine operating conditions while at the same time allowing freedom of independent radial growth. This freedom of radial movement is shown schematically in FIG. 4 by the difference between the full line position of the shroud 30 during the static state of the rotor and the dynamic state such as that which exists at the maximum engine speed condition of the rotor. For example, the shroud 30 moves radially to a position shown by the broken line 66.

It will be noted that in FIG. 4 the applicants' structure employing retaining pins 50 for axial positioning of the shroud member 30 also provides a resultant axial positioning of the blade members 26 by means of centrally positioned flanges 67. The external portion of shroud member 30 has an axially projecting flange 68 having on its radially outer surface a series of axially-spaced ribs 69 (FIG. 2) to provide the rotating disc with a labyrinth seal, the stationary element of which is formed by a part of the engine structure (not shown).

Another feature of applicants' invention is the arrangement of the radial plate portion of shroud member 30 such that a plate 70 will diverge outwardly from the vertical plane of an axis 72. At its outer periphery the amount of divergence of the plate 70 from a vertical trace line 74 would be of the order of a few thousandths of an inch. The amount of concave-conical or dish shape imparted to the shroud plate is determined by the measurement X which indicates the distance the platform portion 28 extends axially beyond the trace line 74.

By virtue of the outwardly diverging or conical plate design, applicants utilize the centrifugal force acting upon the plate 70 when the rotor assembly is in operation, tending to force the plate 70 to travel in the vertical plane of the trace line 74. However, because of the platform 28, the plate 70 can not physically move to a vertical position so that the centrifugal force acts to attain a rim clamping seal between the plate rim 38 and the surface 34. In effect, there is achieved a dynamic equalization between the internal pressure load in a passage 76 and the centrifugal force, thus avoiding gross leakage of air.

It will be appreciated that while the foregoing description deals with upstream shroud member 30, the operation of the downstream shroud member 32 is identical in its function of sealing a cooling air passage 78 by providing centrifugal clamping forces of the rim 40 against the surface 36. The pins 52 allow the shroud member 32 to be self-sustaining in the same manner as explained with reference to the member 30.

It can be seen that due to the self-sustaining mounting arrangement of the shroud plates 30 and 32, considerable weight advantage has been attained by elimination of a heavy structure such as a bolted or interlocked plate and disc securing means. Also, the reduction of the radial load, due to allowance for different rates of expansion between the disc 12 and the shroud plates, results in eliminating heavy flange/ring requirements. For example, in the present embodiment, wherein the radial dimension of the shroud plates 30 and 32 is of the order of one-fourth the overall radial distance between axis 20 and the outer periphery of the shroud plate rims 38 and 40, applicants were able to perfect a saving of 15 to 20 percent in the gross weight of the turbine rotor assembly.

An additional feature of applicants' novel shroud plate 30 or 32 is the incorporation of radial slots, indicated diagrammatically at 82 in FIG. 1, to eliminate stresses caused by the thermal gradiant between the outer edge of the plate and the body portion thereof. The thermal gradient can in a particular case range from a temperature of approximately 1500° F. at the outer edge to a temperature of approximately 750° F. at a radially inward location of the order of four-tenths of an inch. To prevent distortion of the outer rim of the shroud plate, the radial slots 82 have arcuate relief portions 84 which will permit expansion and contraction of the rim portion. In the instant embodiment the slots could have a width of the order of 0.005 of an inch and a radial dimension of the order of 0.400 of an inch.

The detailed description of the preferred embodiment of the invention for the purpose of explaining the principle thereof is not to be construed as limiting the invention, since modification may be made by the exercise of skill of the art within the scope of the invention.

We claim:

1. A bladed rotor for an axial flow fluid machine comprising, a disc member having a central hub portion and an outer periphery, a ring of blades mounted on the outer periphery of said disc member, each blade having a substantially axially facing surface adjacent the outer periphery of said disc member, a shroud member of annular ring form which is separate from the disc member and each blade, and means retaining said shroud member on said disc member, said retaining means comprising, pin members positioned in aligned apertures provided in said shroud and disc members, said disc member and said shroud member each being movable relative to said pin members, whereby said shroud member is self-sustaining in that it is free to move radially inward and outward during rotor operation.

2. The bladed rotor as defined in claim 1, wherein said shroud member is provided with a concave conical surface whereby during rotation of said rotor the centrifugal force acting on said shroud member effects sealing of an outer rim portion of said shroud member against the blade surface.

3. The bladed rotor as defined in claim 1 wherein:
 (a) the outer periphery of said disc member is provided with an axially directed flange, and
 (b) such shroud member is generally L-shaped in cross section having an axially directed flange positioned concentric with said disc flange and spaced inwardly therefrom.

4. A bladed rotor for an axial flow fluid machine comprising, a disc member having a central hub portion and an outer periphery, said outer periphery of said disc member is provided with an axially directed flange, a ring of blades mounted on the outer periphery of said disc member, each blade having a substantially axially facing surface adjacent the outer periphery of said disc member, a shroud member of annular ring form which is separate from the disc member and the blades, said shroud member being generally L-shaped in cross section and having an axially directed flange positioned concentric with said disc member flange and spaced inwardly therefrom, and means retaining said shroud member on said disc member comprising, a plurality of diametrically positioned pins positioned in aligned apertures in said disc member flange and said shroud member flange and pin holding means located on said shroud member flange operable to allow limited axial movement of said pins during rotation of said rotor, whereby said shroud member is self-sustaining in that it is free to move radially inwardly and outwardly during rotor operation.

5. The bladed rotor as defined in claim 4, wherein:
 (a) said pin holding means comprises a dual socket retainer having a central body portion between said sockets, and
 (b) means securing said body portion to said shroud flange equidistant between each pair of adjacent retaining pins whereby each of said sockets encloses the head portion of its associated pin to permit limited axial movement of the pin.

6. The bladed rotor as defined in claim 1, wherein said shroud member is of annular ring form having a radial dimension such that the centrifugal load on the ring is entirely containable in the tangential stress capacity of the ring.

7. The bladed rotor as defined in claim 6, wherein said radial dimension of said shroud member is of the order of one-fourth the overall radial distance between the axis of rotation of the rotor and the outer periphery of said shroud member.

8. The bladed rotor as defined in claim 1, wherein the outer edge of said shroud member is provided with a plurality of radial slots spaced at equal intervals.

9. The bladed rotor as defined in claim 2, wherein the axially facing surfaces of the blades are located on platforms extending axially a distance whereby the outer periphery of the shroud member diverges outwardly from the plane of symmetry of the rotor.

10. The bladed rotor as defined in claim 1 wherein said shroud member is provided with a plurality of radial slots disposed about the circumferential periphery of said shroud member, which permits radial expansion and contraction of said shroud member.

11. The bladed rotor as defined in claim 4 wherein:
(a) said pin holding means comprises a dual socket retainer having a central body portion between said sockets; and means securing said body portion to said shroud member flange; and
(b) said pins each having a head portion and each socket enclosing the head portion of its associated pin to permit limited axial movement of each pin.

References Cited

UNITED STATES PATENTS

| | | |
|---|---|---|
| 2,988,325 | 6/1961 | Dawson. |
| 3,051,438 | 8/1962 | Roberts et al. |
| 3,181,835 | 5/1965 | Davis. |
| 3,295,825 | 1/1967 | Hall. |

FOREIGN PATENTS

| | | |
|---|---|---|
| 790,029 | 1/1958 | Great Britain. |
| 802,476 | 10/1958 | Great Britain. |
| 947,553 | 1/1964 | Great Britain. |

EVERETTE A. POWELL, Jr., Primary Examiner

U.S. Cl. X.R.

253—77